E. R. CAHOON.
HARNESS SADDLE.
No. 184,334. Patented Nov. 14, 1876.
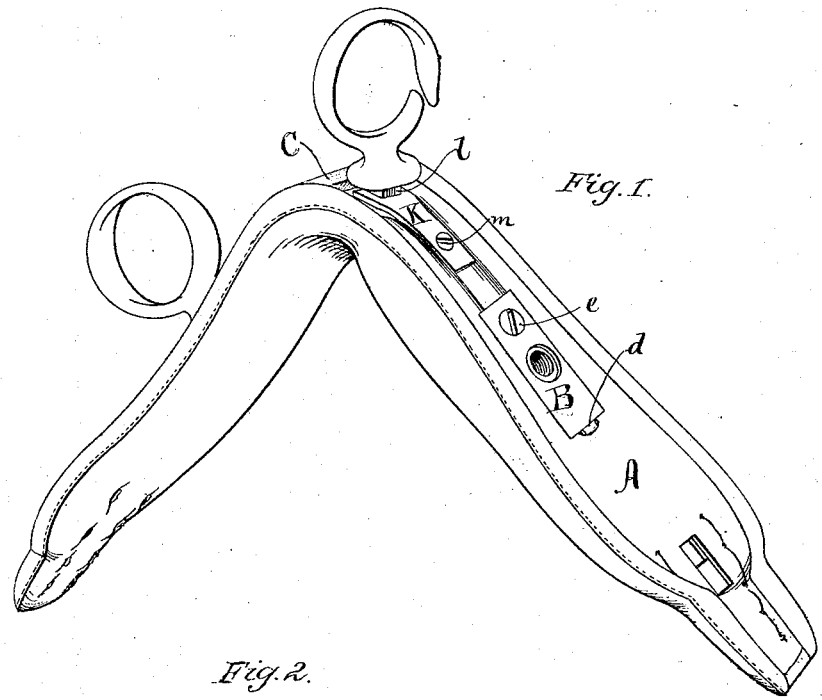
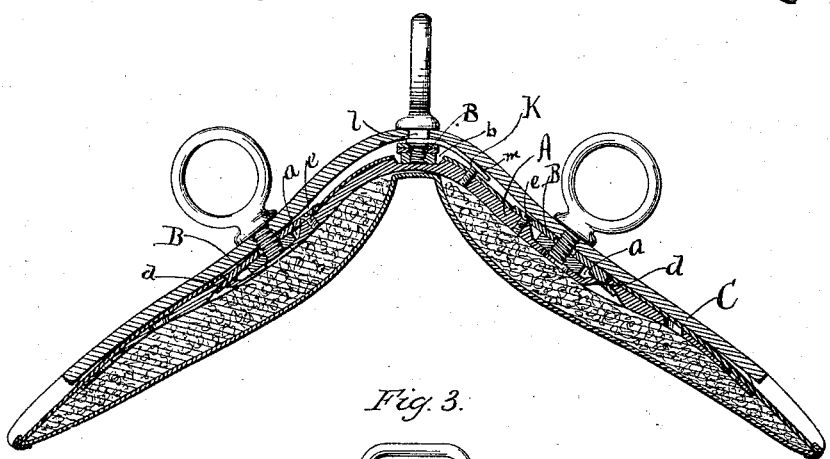
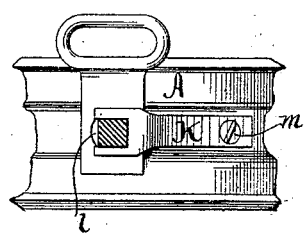
Witnesses:
C. Clarence Poole
E. P. McEau
Inventor:
E. R. Cahoon
By his atty R. D. Smith

UNITED STATES PATENT OFFICE.

EDWIN R. CAHOON, OF NEWARK, NEW JERSEY.

IMPROVEMENT IN HARNESS-SADDLES.

Specification forming part of Letters Patent No. 184,334, dated November 14, 1876; application filed October 13, 1876.

*To all whom it may concern:*

Be it known that I, EDWIN R. CAHOON, of Newark, in the county of Essex and State of New Jersey, have invented new and useful Improvements in Harness-Saddles; and that the following is a full and complete specification of the same, having reference to the accompanying drawing, wherein—

Figure 1 is a perspective view of my improvement, the leather top being removed on one side. Fig. 2 is a longitudinal section of the same. Fig. 3 is a top plan, showing the water-hook key.

This invention relates to improvements in the saddle-tree, whereby the terret and water-hook nuts are securely attached and held in place in the said tree, and easily removed when desired, and also to a method of securing the water-hook from turning, either forward or backward, after being once screwed home; and it therefore consists, first, in a saddle-tree constructed with pockets to receive the terret and water-hook nuts, and suitable covers to retain the same in place; and, secondly, in a forked key to straddle the square of the water-hook shank, and, when secured to the tree, prevent said hook from turning.

That others may fully understand my invention, I will particularly describe it.

A is the saddle-tree, provided with two recesses or pockets, *a*, in its upper surface for the terret-nuts, and with a similar recess, *b*, for the water-hook nut. These recesses or pockets are provided with covers B, secured by screws or otherwise, as may be desired; but I prefer to cast the tree with a suitable orifice at the lower end of each pocket *a*, through which a finger, *d*, of the cover B may be inserted to hold that end of said cover, and to secure the opposite end with a screw, *e*. This method is cheap and efficient, and makes the removal or insertion of the nuts easy, because the top surface of the tree A is concealed by a leather cover, C, only, which is secured in place by the terret-screws, water-hook, and pad-screws, all easily removable to expose the top of the tree, so that if at any time it is desirable to change the trimmings, it can be readily effected in a few minutes' time. The key K has at one end a fork fitted to straddle the square of the shank of the water-hook, so that, after the same has been screwed down, the forked end of said key is slipped up under the leather cover C until it straddles said square, and then said key is secured in place by a screw, *m*, inserted through it into the tree, or by some other efficient locking device.

Having described my invention, what I claim as new is—

1. A saddle-tree, A, constructed with pockets in its upper surface, to receive and confine the terret and water-hook nuts, combined with removable plates C, adapted to cover and close said pockets and confine said nuts in place.

2. A saddle-tree, A, and water-hook, combined with a key, K, attached to said tree, and adapted to lock said water-hook, as set forth.

EDWIN R. CAHOON.

Witnesses:
R. D. O. SMITH,
E. R. McKEAN.